US007775882B2

(12) United States Patent
Kawamura et al.

(10) Patent No.: US 7,775,882 B2
(45) Date of Patent: Aug. 17, 2010

(54) GAME APPARATUS FOR CHANGING A VISUAL POINT POSITION OF A VIRTUAL CAMERA IN CONJUNCTION WITH AN ATTACK BY AND ENEMY CHARACTER

(75) Inventors: Hiroaki Kawamura, Tokyo (JP); Toshiyuki Shimizu, Tokyo (JP)

(73) Assignee: Kabushiki Kaisha Sega, Tokyo (JP)

( * ) Notice: Subject to any disclaimer, the term of this patent is extended or adjusted under 35 U.S.C. 154(b) by 1061 days.

(21) Appl. No.: 11/452,098

(22) Filed: Jun. 12, 2006

(65) Prior Publication Data
US 2007/0298881 A1 Dec. 27, 2007

(51) Int. Cl.
*A63F 13/00* (2006.01)
(52) U.S. Cl. .............................. 463/32; 463/8
(58) Field of Classification Search ................. 463/1, 463/7–8, 30–34, 42
See application file for complete search history.

(56) References Cited

U.S. PATENT DOCUMENTS 6,126,545 A * 10/2000 Takahashi et al. ............. 463/32
6,736,724 B1 * 5/2004 Erikawa et al. ................ 463/7
2001/0024972 A1 * 9/2001 Kitao ............................ 463/33

FOREIGN PATENT DOCUMENTS

JP 116343/1995 5/1995

OTHER PUBLICATIONS

"Time Crisis3: Cinematic Gun-Shooting Game", *Bandai Namco Games Channel* <http://namco-ch.net/timecrisis3/stage.html>.

* cited by examiner

*Primary Examiner*—Scott Jones
(74) *Attorney, Agent, or Firm*—Wenderoth, Lind & Ponack, L.L.P.

(57) ABSTRACT

A game apparatus which can realize a totally new expression of a fear on a game image is provided. The game apparatus includes an image generating means that uses a visual point position of a player character as a visual point position of a virtual camera and generates an image within a visual range captured by the virtual camera, an enemy character control means that allows the enemy character to mount an attack such that the visual point position of the player character is changed and moves an enemy character within a specified range viewed from the visual point position changed due to the attack to the visual range of the player character viewed from the visual point position, and a camera work control means that changes a visual point position in a three-dimensional coordinate system of the virtual camera in conjunction with the attack motions.

17 Claims, 14 Drawing Sheets

GAME APPARATUS FOR CHANGING A VISUAL POINT POSITION OF A VIRTUAL CAMERA IN CONJUNCTION WITH AN ATTACK BY AND ENEMY CHARACTER

BACKGROUND OF THE INVENTION

1. Field of the Invention

The present invention relates to a game apparatus and a program for displaying an enemy character controlled by a computer as a game image on a screen and battling with the enemy character in a manner that a player operates an operating means.

2. Description of the Related Art

In game apparatuses that realize computer games such as so-called action games and role playing games, leading characters (play characters) in game images displayed on screens of display devices are controlled according to manipulate signals from input devices (controller pads) operated by players, so that stories of the games make progress. In recent years, as hardware performance improves, game images where player characters act in virtual three-dimensional space are provided by three-dimensional graphics so that a productive effect of the games is heightened.

The three-dimensional graphics are used for obtaining a spatial position relationship of an object in a visual line direction from a visual point position in a virtual three-dimensional space based on three-dimensional data expressing the object and executing an image process such as a rendering process so as to express the object three-dimensionally. That is to say, in games utilizing the three-dimensional graphic, play characters and other objects are expressed three-dimensionally and images captured from a predetermined visual point position in the game space are displayed.

In game apparatuses that provide game images, which express virtual three-dimensional spaces from particular camera angles in game images using a lot of three-dimensional graphics such as action games, for example, the following game image is provided. For example, the game image is obtained in a manner that characters that move in game spaces according to a player's operations are tracked to be taken by a virtual camera arranged in a position above and behind the character. In the case where a thing other than a background which is present in the far distance, such as fog is expressed, an effect image on which the background is expressed is synthesized with images of a far background and a character so as to be displayed. As a result, various things which enter the visual field of the virtual camera are expressed, thereby providing a sense of reality.

As computer games which progress using such a virtual camera, games where a visual point can be switched is realized. For example, in a driving game, an image can be switched into images viewed from desired visual points according to a player's operation (see Japanese Patent Application Laid-Open No. 7-116343, for example). Such visual points include: a visual point 1, "a slightly rear side of a self vehicle"; a visual point 2, "a visual point of a player (driver); a visual point 3, "low-level rear side of the self vehicle"; and a visual point 4, "high-level rear side of the self vehicle". There is a so-called gun shooting game where an image viewed from a visual point different from the above visual points is displayed. In the genre of this game, an image where an enemy is shot in the scene that the visual point of a player is rolled in a certain scene of the game so as to be upside down is disclosed.

SUMMARY OF THE INVENTION

In computer games such as horror games where a player feels terror, for example, a player character is not displayed on purpose, an image within a visual field captured from the player's visual point position is displayed, and a virtual creature in a fearful shape is allowed to appear in the visual range so that the feel of terror is given to the player by sounds and images. Further, a facial expression and backgrounds, such as darkness and sound effects, give the sense of terror to the player. In conventional game apparatuses that execute such games, however, in a scene of battle with opponents, an image in the visual range is dreary, or offense and defense with opponents are dreary. For this reason, a representation of a life like sense of fear is not realized by the players.

The present invention is devised in order to solve the above problem, and its object is to provide a game apparatus which is capable of realizing totally new expression of fears, such as a fear of being attacked by numerous enemies, a fear of being captured by enemies, and a fear of being pushed down and surrounded by enemies with the enemies looking down the player, on a game image.

The present invention relates to a game apparatus that displays an enemy character controlled by a computer as a game image on a screen, and battles with the enemy character using an operating means operated by a player. The object of the present invention is realized by providing: an image generating means that uses a visual point position of a player character moving in a virtual three-dimensional space as a visual point position of a virtual camera and generates an image within a visual range captured by a virtual camera as the game image; an enemy character control means that allows the enemy character to make an attack which changes the visual point position of the player character, and moves an enemy character within a specified range viewed from the visual point position changed due to the attack to a visual range of the player character viewed from the visual point position; and a camera work control means that changes the visual point position of the virtual camera in a three-dimensional coordinate system in conjunction with the attack motions.

The above object of the present invention is achieved more effectively by the following. The enemy character control means allows a first enemy character group within an attack possible range with respect to the visual point position of the player character to make a specified attack according to the visual point position, and allows a second enemy character group out of the attack possible range to stand by behind the first enemy character group. The enemy character control means monitors whether the first enemy character group is knocked down by the player character and whether the group has vacancies, and when the group has vacancies, the enemy character control means allows the second enemy character group to move sequentially so that the vacancies are filled. The visual point position changed due to the attack is maintained, and when the enemy character group within the visual range of the player character is knocked down completely, the visual point position of the player character changed due to the attack is returned to an original position.

The above object of the present invention is achieved more effectively by the following. When the enemy characters within the specified range are moved to the visual range of the virtual camera, the enemy character control means allows the respective enemy characters to be aligned in a specified position and to be assembled within the visual range. When the attack is an attack pattern for pushing down the player character, the enemy character control means controls motions of the enemy characters assembled within the visual range of the virtual camera so as to allow the enemy characters in a group to push the player character. When the player character is pushed down onto the ground by the attack, the enemy character control means allows the enemy character which mounts the attack and the other characters to approach the player character within the visual range. After the player character is pushed down or is flung by the attack, the enemy character control means controls motions of the enemy characters positioned on the front row aligned in the visual range of the virtual camera so as to allow the enemy character in a group to attack the player character. When the attack is an attack pattern for flinging the player character, the enemy character control means allows the enemy character which makes the fling attack and the other characters to move with them being in a row sideways within the visual range, and allows enemy characters which cannot be in the line to move to a rear line.

The above object of the present invention is achieved more effectively by the following. When the enemy character does an attack motion by hand, the camera work control means changes a height of the visual point of the virtual camera according to a change in the position of the hand, and changes a direction of the virtual camera to a direction of a head of the enemy character. When the player character is pushed down onto the ground, the camera work control means changes a direction of the virtual camera to an obliquely upward direction with respect to the visual point position of the player character in the pushed-down posture. When the attack is an attack pattern for pushing down the player character, the camera work control means reduces a change amount of the virtual camera in a height direction of the visual point position just before the player character is pushed down by the enemy character or the player character breaks off the enemy character. The camera work control means uses an operating amount of the operating means and the total number of enemy characters within the attack possible range in the visual range as correcting parameters, and interpolates a change amount of the visual point position of the virtual camera based on the correcting parameters. When the attack is an attack pattern for pushing down the player character, the camera work control means compares the sum of forces of the enemy character group assembled within the visual range of the virtual camera for pushing down the player character with a force for breaking off the enemy characters determined based on the operating amount of the operating means sequentially, and changes a change amount per means time of the virtual camera in the height direction of the visual point position according to a difference between both the forces.

The above object of the present invention is achieved more effectively by the following. In the case where the attack is an attack pattern for flinging the player character or an attack pattern for clutching a body of the player character, when the enemy character which mounts the attack is positioned on the left or right side of the player character from the player's visual point, the camera work control means moves the virtual camera to a front position of the enemy character when the enemy character mounts the attack. When the attack is an attack pattern for flinging the player character or an attack pattern for clutching a body of the player character, the camera work control means calculates a position of an intermediate point between the left hand and the right hand of the enemy character based on position coordinates of the hands and the head of the enemy character, and interpolates the visual point position of the virtual camera so that the visual point position of the virtual camera is on a straight line passing through the head portion and the intermediate point, and is separated from the intermediate point by a predetermined distance. The operating means has an acceleration sensor which detects an acceleration generated according to a predetermined operation, and the camera work control means changes the visual point position of the virtual camera according to a detecting amount of the acceleration.

Further, the present invention relates to a program executed by a computer in which an enemy character controlled by the computer is arranged in a virtual space, a player is allowed to battle with the enemy character based on a manipulate signal from an operating means and an image obtained by viewing the virtual space from a predetermined visual point is output as a game image to a display means. The above object of the present invention is achieved by the program including a processing routine for allowing the computer to execute: an image generating means that generates an image within a visual range captured by the virtual camera using a visual point position of the player character moving in a virtual three-dimensional space as a visual point position of the virtual camera; an attack pattern selecting means that selects an enemy character attack pattern from enemy character attack pattern information stored in a storage means; a visual point moving means that, when the attack pattern selected by the attack pattern selecting means is an attack pattern with a predetermined conversion of the visual point, moves the visual point to a visual point position according to the attack pattern; an enemy character position determining means that determines whether the enemy character enters the visual range viewed from the visual point position; an enemy character moving control means that, when the determination is made that the enemy character does not enter the visual range viewed from the visual point position, moves the enemy character to a predetermined enemy character position set within the visual range; and an enemy character control means that, when the enemy character attacks the player character in a specified attack pattern, moves the enemy character so that the enemy character in the vicinity of the player character enter the visual range of the virtual camera.

According to the present invention, the enemy character in the vicinity of the player character is moved within the visual range, the visual point position of the player character is used as the visual point position of the virtual camera, and the visual point position of the virtual camera in the three-dimensional coordinate system can be changed in conjunction with the attack motions of the enemy character. For this reason, totally new expression of fears, such as a fear of being attacked by numerous enemies, a fear of being captured by enemies, and a fear of being pushed down and surrounded by enemies with the enemies looking down the player, can be realized on the game image.

A motion such that the enemy flings the player, for example, can be expressed clearly and simply by a viewpoint of the third person, but in the case of a viewpoint of the first person, the camera seems to only turn. In the present invention, however, since the visual point position of the virtual camera in the three-dimensional coordinate system is changed in conjunction with the attack motions of the enemy character, the feeling of being flung by an enemy can be expressed successfully. Further, just before the player is pushed down by the enemy character, and just before the player breaks off the enemy character, a change amount of the virtual camera in the height direction is set to be small. As a result, effects of close offensive and defensive battle with enemies, persistency, and tactics can be produced. When the camera is pushed down, the enemy which mounts the attack and the other enemies approach the camera, so that the fear of being surrounded by enemies and frustration of at having no way out can be brought to the player.

DESCRIPTION OF THE PREFERRED EMBODIMENTS

Embodiments of the present invention are explained in detail below with reference to the drawings. As an example of a game apparatus of the present invention, a commercial shooting game apparatus is explained but type of games and a hardware structure are not limited to the embodiments.

Figure 1:
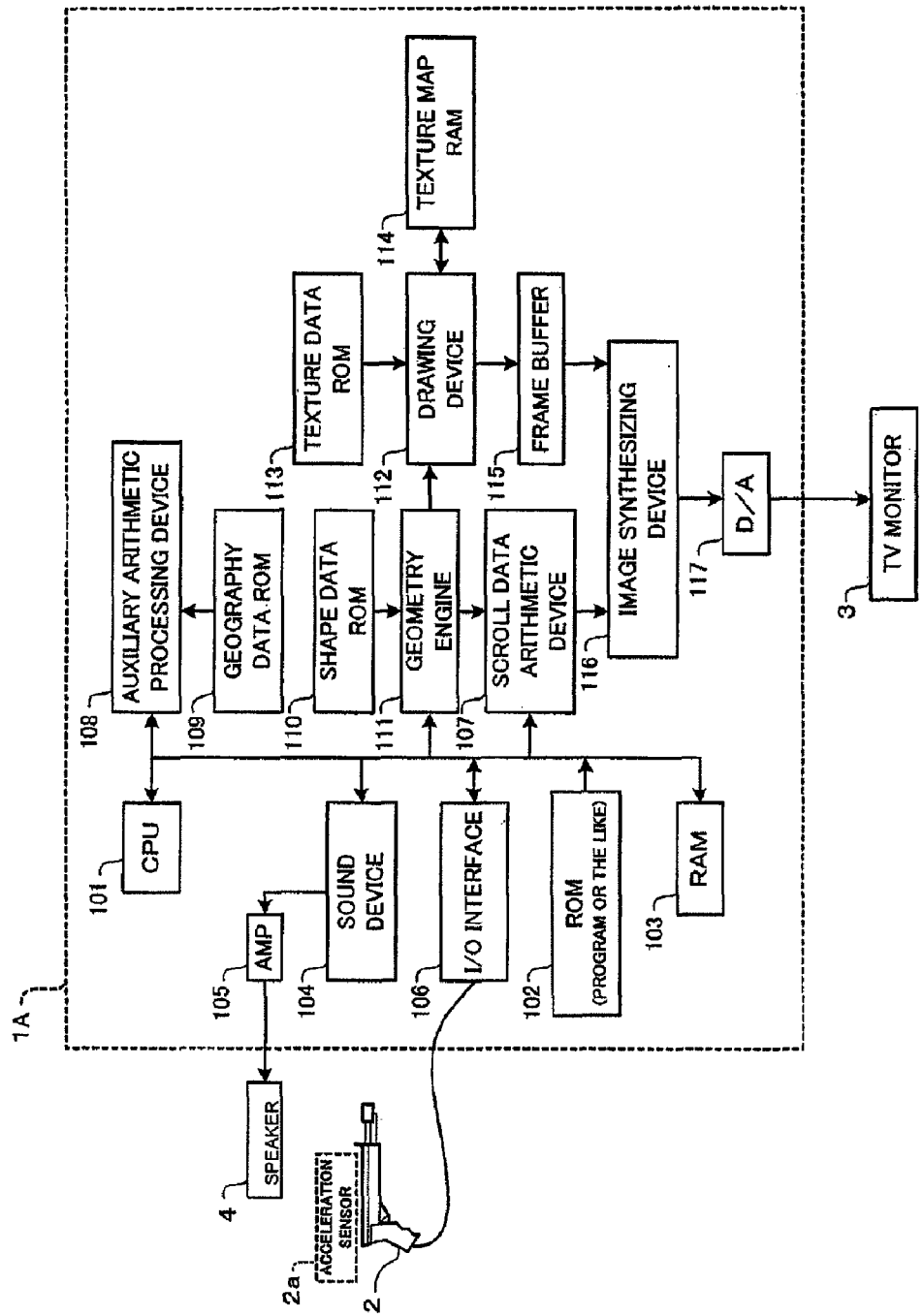
FIG. 1 is a block diagram illustrating one example of a hardware structure of a game apparatus according to the present invention.

FIG. 1 is a block diagram illustrating one example of a hardware structure of the game apparatus according to the present invention. In FIG. 1, the game apparatus 100 has a game apparatus main body 1A, a gun controller 2 as an operating means, a TV monitor (television monitor) 3 as an image display means and a speaker 4 as a sound output means.

The game apparatus main body 1A has a CPU (central processing means) 101, a ROM 102, a RAM 103, a sound device 104, an I/O interface 106, an amplifier 105, a scroll data arithmetic device 107, an auxiliary arithmetic processing device 108, a geography data ROM 109, a shape data ROM 110, a geometry engine 111, a drawing device 112, a texture data ROM 113, a texture map RAM 114, a frame buffer 115, an image synthesizing device 116, and a D/A converter 117. Geography data such as moving courses of a virtual camera are stored as polygon data into the geography data ROM 109 in advance. The geometry engine 111 is, for example, a device that generates data obtained by perspective transforming shape data from a coordinate system in a three-dimensional virtual space into a visual range coordinate system. A hardware device in the game apparatus main body 1A is publicly known, and the explanation of operating examples of respective devices is omitted.

The gun controller 2 has an acceleration sensor 2a that detects a two-dimensional (X-axial and Y-axial directions) acceleration in this embodiment. The acceleration sensor 2a is used for detecting motions (fluctuation, turn and rotation of the gun controller 2) other than shooting of bullets by a player, such as "to shake the gun controller in order to intimidate an enemy" and "to regard the gun controller as a magic wand and cast a spell".

Before the explanation of the characteristic technical terms of the present invention, the outline of a process in a battle scene in the shooting game apparatus of the present invention is explained.

Figure 2:
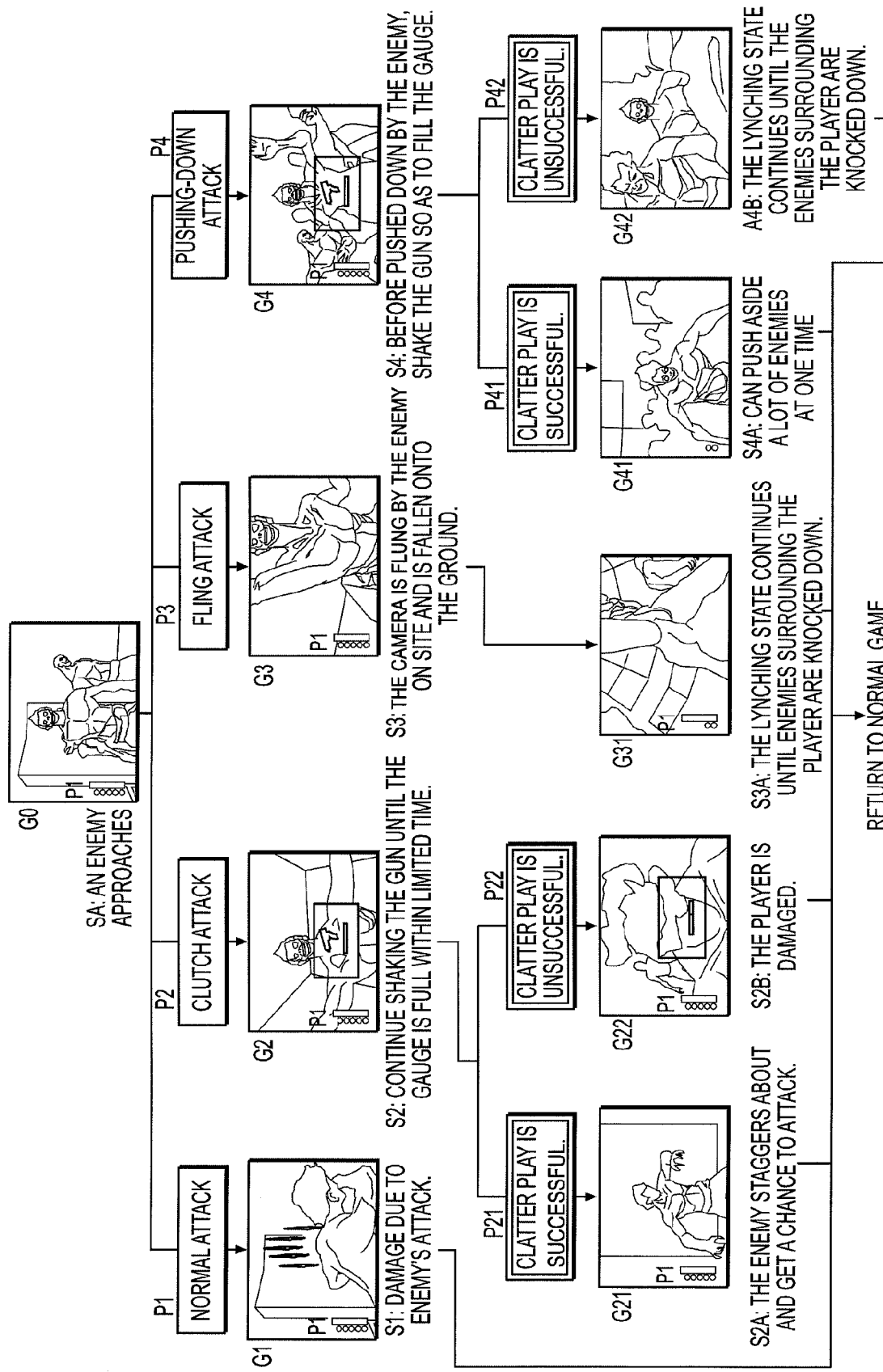
FIG. 2 is a diagram illustrating a flow of attack motions of enemy characters and screen examples according to the present invention.

FIG. 2 illustrates the flow of attack motions of enemy characters according to attack patterns, and the respective images in FIG. 2 show examples of a video output (one frame of moving image) by means of the virtual camera. In this embodiment, an image within a visual range which is viewed from a player's visual point as a position of the virtual camera is output to a display device such as the TV monitor 3. An image of a player character is not displayed on a game screen except in a special case. In this embodiment, the enemy character is a "zombie" expressed by polygon, and the motions of the individual enemy characters are automatically controlled by a computer. A computer program for controlling the opponent characters is called "enemy AI" (artificial intelligence) for convenience sake, and an enemy character which is controlled by the enemy AI is called "enemy". "Player character" whose moving motions are automatically controlled by the computer or whose motions are controlled by player's operation of the operating means is called "player" for convenience sake.

As shown in an image G0 of FIG. 2, when, for example, the player encounters an enemy during walking in a building (in this embodiment, the enemy whose height is about 2 min a normal scene), the enemy approaches the player (virtual camera) (step Sa). Attack patterns of the enemy controlled by the enemy AI include: "normal attack" P1; "clutch attack" P2; "fling attack" P3; and "pushing-down attack" P4.

At the normal attack P1 as shown in an image G1, an image showing a state of damage due to an enemy's attack is output. At this time, the position of the virtual camera is temporarily moved to an obliquely rear side of the player's visual point position, and player images are synthesized so that a state that the player is attacked by the enemy is displayed as shown in an image G1.

At the other patterns P2, P3, and P4, the player is not displayed, an image within the visual range which is captured from the player's visual point as the visual point position of the virtual camera is generated by controlling the motions of the enemy AI, mentioned later, and controlling the virtual camera (player camera). In such a manner, the sense of a fear at the time of being attacked by the enemy is produced by the image (moving image) and sound effects. Also in the normal scene where the player walks (or runs) in a virtual three-dimensional space, an image within the visual range which is captured from the player's visual point is displayed, so that the sense of a fear at the time of moving an area where the enemy appears is produced by images and sound effects. In this embodiment, the player controls the player's motions which are mainly the battle (attack, defense) motions using the operating means, and the motion such that player moves in a building is automatically controlled by the computer.

At the clutch attack P2, as shown in an image G2, an image which shows an attack state that a player's body parts such as head, neck and body are clutched by an enemy's both hands is output. When the player encounters the clutch attack P2, the operation for shooting bullets using the gun controller 2 is disabled by a process for forbidding acceptance of a shooting signal. In order to avoid this state, the player continuously shakes the gun controller 2 (step S2). In this embodiment, when the gun controller 2 is continuously shaken, a clatter sound is generated by an internal mechanism of the gun controller 2. The operation for shaking the gun controller 2 is called "clatter play" for convenience sake.

The control section of the game apparatus main body 1A recognizes the operation of the clatter play based on a detected signal of the acceleration sensor output from the gun controller 2 (detect the shaking of the gun controller 2). The control section increases the amount of a gauge (clatter meter) according to a detected amount of the acceleration, for example. When the clatter play is continued, the level of the gauge rises. When the gauge is full (maximum value) within a limited time, the clatter play is determined to be successful (P21), and as shown on the image G21, an image showing that the enemy staggers about is output, and the forbidden state of the bullet shooting operation is canceled. As a result, the player takes a chance of attack (step S2a). On the other hand, when the gauge is not full within the limited time, the clatter play is determined to be unsuccessful (P22), and the player suffers damage according to the attack amount of the enemy delivering the clutch attack. An image G22 showing the damage amount is displayed (step S2b), and then the game returns to the normal game.

At the fling attack P3, as shown in an image G3, an image showing the state that the player is flung is output. At this time, the player is regarded as the virtual camera, the position and direction of the virtual camera are controlled so that the virtual camera falls to the ground, and images from that position and direction are output (step S3). As shown in an image G31, an image which shows a state that the player (virtual camera) is surrounded and attacked by enemies in a group (lynching state) is output. When the player gets the fling attack P3, the bullet shooting operation can be performed by the player, but motions of getting up, walking backward and running away cannot be taken. The player fights back while looking up the enemies, and the lynching state continues until the player knocks down the surrounding enemies (step S3a). At the time when the player knocks down all the surrounding enemies, the normal game is returned.

At the pushing-down attack P4, as shown in an image G4, an image which shows a state that the enemy pushes the player's body with the enemy's both hands is output. When the player gets the pushing-down attack P4, similarly to the clutching attack P2, the bullet shooting operation cannot be performed. Before being pushed down, the player tries to fill up the gauge by means of the clatter play (step S4). When the clatter play is successful before the player is pushed down, the player can push aside a lot of enemies at one time. When the control section of the game apparatus main body 1A determines that the clatter play is successful (P41), as shown in an image G41, an image which shows a state that a lot of enemies are pushed aside is output (step S4a). On the other hand, when the determination is made that the clatter play is unsuccessful (P42), an image which shows a state that the player is pushed down onto the ground is output. Thereafter, similarly to the fling attack P3, the image which shows a state that the player is attacked by a group of the enemies surrounding the player (lynching state) is output. The lynching state continues until player knocks down the enemies surrounding the player using the gun with the player being incapable of getting up (step S4b). At the time when the player knocks down all the surrounding enemies, the normal state (standing posture) is returned.

The control of the enemy AI's motion and the control of the virtual camera in the process in the above-mentioned battle scene are explained.

Figure 3:
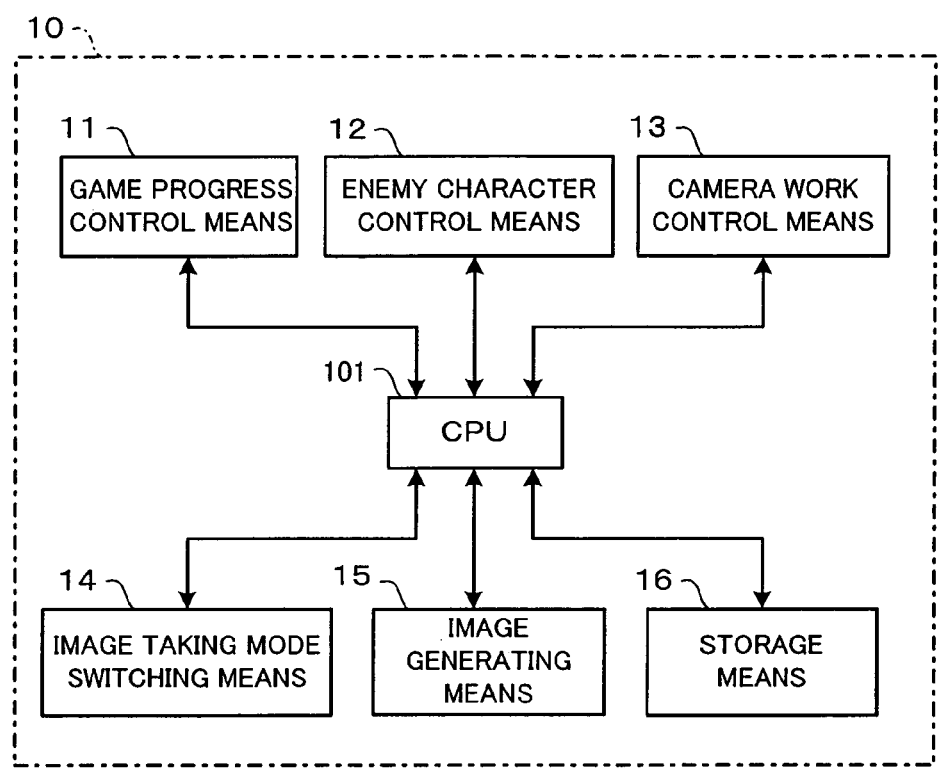
FIG. 3 is a functional block diagram illustrating one example of a software structure of the game apparatus according to the present invention.

FIG. 3 is a functional block diagram illustrating one example of a software structure for realizing the control of the enemy AI's motion and the control of the virtual camera according to the present invention. The respective means 11 to 15 shown in FIG. 3 are realized by computer programs to be controlled by the CPU 101 in this embodiment, and the programs are stored in a predetermined storage medium. At the time of execution, the programs operate as memory-resident programs or overlay programs. The respective means 11 to 15 are named and classified according to functions for convenience sake, and thus they do not limit the software structure. The image generating means 15 may be composed of hardware such as the scroll data arithmetic device 107, the geometry engine 111, the drawing device 112 and the image synthesizing device 116 shown in FIG. 1, namely, like this, the respective means 11 to 15 are not limited to only the software.

In FIG. 3, the control section 10 of the game apparatus has a means 11 that controls the progress of the entire game including game starting and ending processes ("game progress control means"), a means 12 that control the enemy's motions ("enemy character control means"), a means 13 that controls the camera work of the virtual camera ("camera work control means), a means 14 that switches the image taking mode (normal mode and special image taking mode) of the virtual camera ("image taking mode switching means"), and a means 15 that generates an image within the visual range captured from the virtual camera as a game image ("image generating means").

The enemy character control means 12 corresponds to the enemy AI, and automatically controls the motions of the enemies arranged in predetermined positions of the virtual three-dimensional space in advance (or the enemies who appear in predetermined positions according to the game progressing condition) according to predetermined algorithm. In this embodiment, at the normal time, enemies are independently allowed to take the motions by control of the individual enemy AIs. At the time of a specified event (for example, in the scene where one enemy mounts an attack), the enemy character control means 12 allows the enemy character to mount an attack which changes the visual point position of the play character, and moves the enemy character within the specified range viewed from the visual point position changed by the attack to the visual range of the play character (=virtual camera) viewed from the visual point position. The enemy character control means 12 allows a first enemy character group within an attack possible range with respect to the visual point position of the player character to mount a specified attack corresponding to the visual point position. The enemy character control means 12 allows a second enemy character group outside of the attack possible range to wait behind the first enemy character group. For example, the enemy character control means 12 monitors whether the first enemy character group is knocked down by the player character and whether the group has vacancies. When the group has vacancies, the enemy character control means 12 moves the second enemy character group sequentially in order to fill the vacancies.

The camera work control means 13 controls the camera works such as visual point position of the virtual camera in a three-dimensional coordinate system, the direction (arbitrary direction), the width of the visual range, zoom-in, and zoom-out. In this embodiment, the eyes of the player are regarded as the virtual camera, an image within the visual range captured from the virtual camera, in other words, an image within the visual range viewed from the visual point position of the player in the three-dimensional game space is taken by the virtual camera. At the time of the specified event, the movement of the virtual camera (the visual point position and the visual line direction of the play character) cooperates with the enemy's attack motions. For example, when the enemy brings up the player, the virtual camera is moved upward so as to approach the enemy. When the player is flung or pushed down by the enemy, the virtual camera is moved or rotated to that direction. In such a manner, the height of the visual point of the virtual camera is changed or the virtual camera is moved to the direction of the attack according to the enemy's attack motions at the specified attack patterns (the attack motions including the motions at the time of being fought back). These controls are made based on the three-dimensional coordinate information about the enemy who mounts an attack (position information about a head and hands) and the three-dimensional coordinate information about the player (=virtual camera) who is attacked.

In the camera work control means 13, the operating amount of the operating means by the player, the total number of enemies assembled in the vicinity of the player, the setting value of a enemy's body type (setting values according to types of enemies such as height and length of hands) and the like are used as correcting parameters of the camera works. The camera work control means 13 makes interpolation such that the amount of change per means time in the height direction of the visual point of the virtual camera is reduced or increased based on the correcting parameters, so as to generates effects of close offensive and defensive battle with enemies, persistency, and tactics.

The image taking mode switching means 14 switching the mode of the virtual camera between the "normal mode" for taking an image based on the setting values of reference parameters (the setting value of the elements of the camera works such as the visual point position, the direction and the width of the visual range in the three-dimensional coordinate system) and the "special image taking mode" for taking an image according to the special camera works based on a change in the reference parameter values, setting of the correcting parameters, functional calculus and the like. In this embodiment, the image taking mode is switched according to the acknowledgment showing enemy's attack motions, a determined result of player's fighting-back operation (in this embodiment, clatter play), and the like.

The image generating means 15 generates an image within the visual range captured from the virtual camera as a game image, and outputs a video signal via the image synthesizing device 116 and the D/A converter 117 shown in FIG. 1, for example. The storage means 16 stores parameters and functions relating to the camera works of the virtual camera, positions and direction data of respective characters, a function conversion equation for converting polygon data in the three-dimensional world coordinate into polygon data in a two-dimensional screen coordinate, and the like therein.

In the above constitution, the control of the enemy AI's motions and the control of the virtual camera according to the present invention are explained by concrete example. The following example refers to the "shooting game" in which the player holds the gun controller 2 in its hand, the gun is aimed at the displayed moving image of the enemy on the screen and the trigger of the gun controller 2 is pulled so as to knock down the enemy.

In this embodiment, the enemy character control means 12 allows the respective enemy AIs to determine their motions. A process relating to all the enemy AIs such as a process for selecting lynching members (enemies who make concentrated attacks on the player) is executed by an enemy management AI that controls the motions of all the enemies or some enemies (one or more enemy AIs set as a management class in advance). The enemy management AI instructs the enemy AIs present in the circumference (within a predetermined distance around the self enemy or the player) to move to an instructed position within the visual range of the virtual camera to be assembled. Further, the enemy management AI instructs the enemies in a group to push down the player onto the ground and to attack the player. In such a manner, the command control is made. The commands at this time are executed by a process for writing information about the specified position and information (action mode) showing the attack patterns into a control table or the like.

Figure 4:
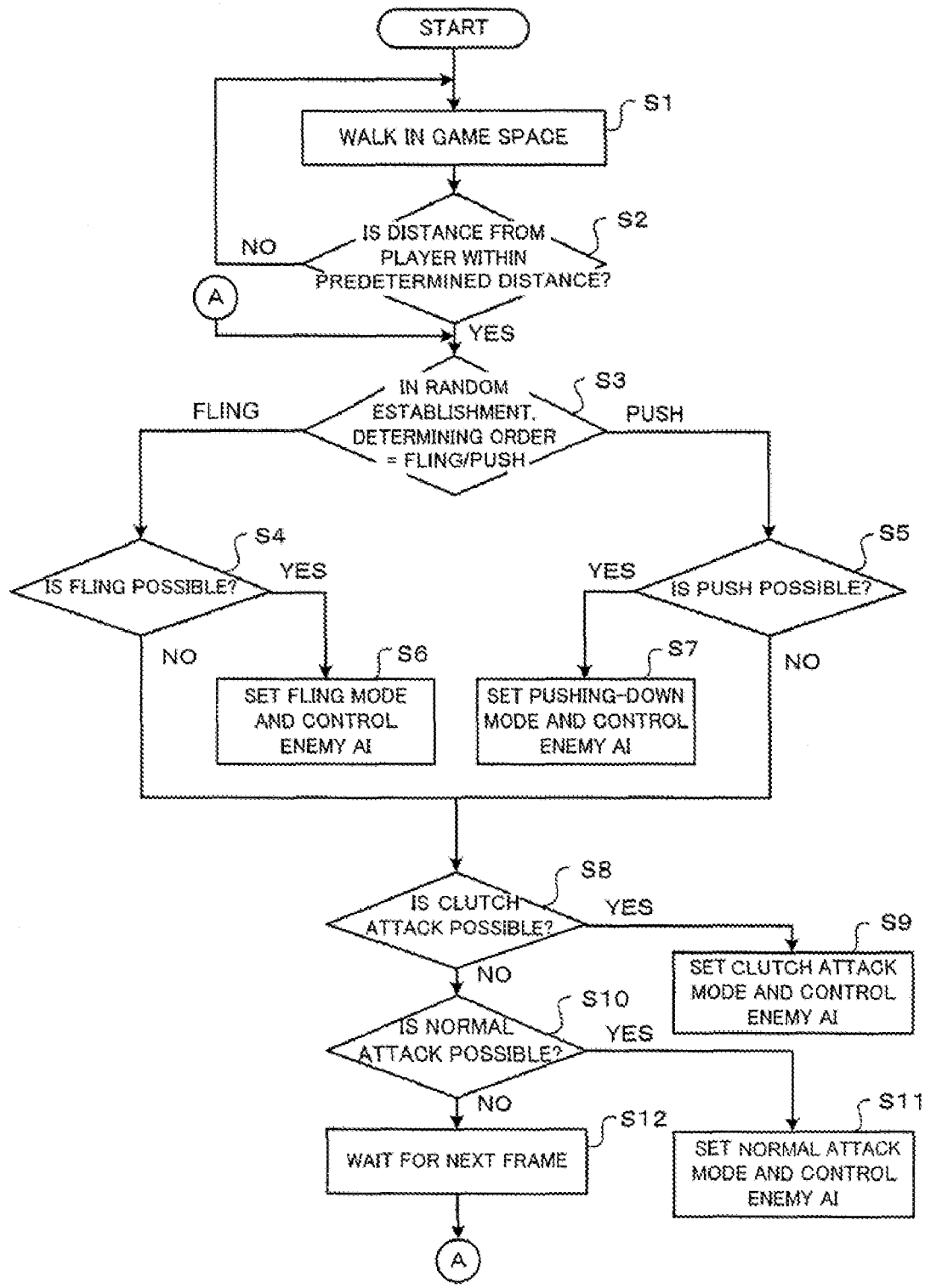
FIG. 4 is a flowchart for explaining a switching process for an operating mode of the enemy character in the present invention.

The action mode to be used for the control of the enemy AIs' motions and the process for switching the action mode are explained below along the flow of the flowchart in FIG. 4.

As the enemy's attack motions, as shown in FIG. 2, the attack patterns such as the normal attack P1, the clutch attack P2, the fling attack P3 and the pushing-down attack P4 are set in advance. As the action mode at the time of the normal event, a "normal action mode" and a "normal attack mode" are stored in the control table. As the action mode at the time of the special event, a "clutch attack mode", a "fling mode", and a "pushing-down mode" are stored in the control table. The action mode is switched by determining whether a predetermined condition for switching into a corresponding attack pattern is satisfied at the game progress step.

The normal action mode, the game progress control means 11 (or a player character control means, not shown) makes a control so that the player walks according to a predetermined algorithm (or according to the operation of the operating means). At this time, the camera work control means 13 takes an image within the visual range captured from the visual point position and the visual line direction at the time when the player walks. The enemy character control means 12 (individual enemy AIs) makes individual enemies walk in the game space (in this embodiment, building) according to predetermined algorithm (step S1). At this time, a distance between the enemy and the player is calculated based on the three-dimensional coordinate information showing the character position (or the two-dimensional coordinate information where height=0). A determination is made whether the distance therebetween is within a predetermined distance, and when it is within the predetermined distance, the sequence returns to step S1, so that the walking motion is continued (step S2).

When the enemy and the player approach each other within the predetermined distance, the sequence goes to a process for determining whether the attacks of the respective patterns are possible. In this embodiment, the order of determining whether the attacks of the respective patterns are possible is determined randomly so that the attack pattern does not become monotonous. The order of determining whether the fling attack P3 and the pushing-down attack P4 are possible is determined randomly. The possibility that the determined order of them at this time is such that the fling attack P3 is the first and the pushing-down attack P4 is the second is determined based on the setting value (for example, 50%) (step S3). The determinations are made whether the fling attack P3 is possible and whether the pushing-down attack P4 is possible according to the randomly determined order. The determinations whether the fling attack P3 is possible and whether the pushing-down attack P4 is possible are made according to the following condition, for example. In an event that a lot of enemies appear, the enemy character control means 12 (enemy AI) determines whether the attacks are possible according to whether all the three conditions are satisfied (steps S4 and S5). The three conditions are: (condition 1) n or more enemies (in this embodiment n=5) including the virtual camera (or the player) are present in the vicinity of the individual enemy (or player) within the visual range of the virtual camera; (condition 2) the individual enemy does not make the fling attack and the pushing-down attack; and (condition 3) the other enemies are not making an attack.

When the determination is made that the fling attack P3 is possible, the action mode is set to the fling mode, and the sequence goes to the control of the enemy AI at the time of the "fling attack" (step S6). On the other hand when the determination is made that the pushing-down attack P4 is possible, the action mode is set to the "pushing-down mode", and the sequence goes to the control of the enemy AI at the time of the "pushing-down attack" (step S7).

When both of the attacks P3 and P4 are not possible, a determination is made whether the clutch attack P2 is possible according to the following conditions. The enemy character control means 12 (enemy AI) determines whether the attack is possible according to whether all the conditions are satisfied (step S8). These conditions are: (condition 1) the individual enemy does not make the clutch attack; (condition 2) the other enemies are not making the attack; (condition 3) a flag showing the clutch attack mode is off; (condition 4) the individual enemy is present within the visual range of the virtual camera (the individual enemy is displayed on the screen); and (condition 5) the probability calculated randomly is the probability of the individual enemy-specific attack or more (setting value). When the determination is made that the clutch attack P2 is possible, the action mode is set to the clutch attack mode, so that the sequence goes to the control of the enemy AI at the time of the "clutch attack" (step S9).

On the other hand, when the clutch attack P2 is not possible, a determination is made whether the normal attack P1 is possible according to the following conditions. The enemy character control means 12 (enemy AI) determines whether the attack is possible according to whether all the conditions are satisfied (step S10). These conditions are: (condition 1) the other enemies are not making an attack; (condition 2) the individual enemy does not make the attack within the past predetermined time (in this embodiment, past three seconds); and (condition 3) the individual enemy is present within the visual range of the virtual camera. When the determination is made that the normal attack P1 is possible, the action mode is set to the normal attack mode, so that the sequence goes to the control of the enemy AI at the time of the "normal attack" (step S11). When all the attacks P1 to P4 are not possible, the sequence waits for a next frame so as to return to step 3 (step S12), and the process after the step 3 is repeated.

The control of the enemy AI and control of the virtual camera in the "fling attack" and the "pushing-down attack" are explained sequentially by giving the concrete examples.

Figure 5:
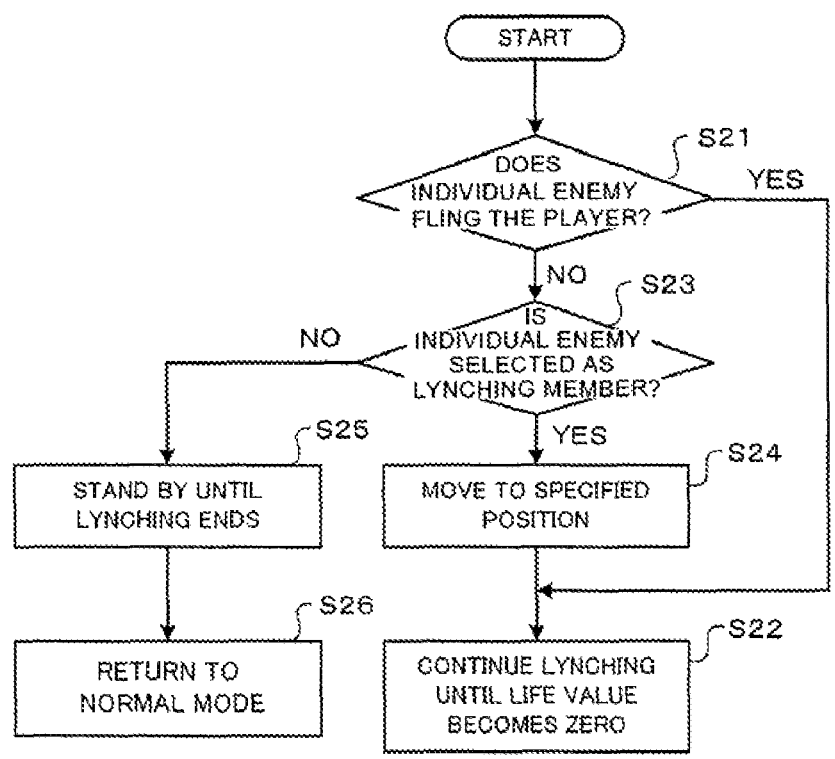
FIG. 5 is a flowchart for explaining a control of an enemy AI at the time of a fling attack in the present invention.

The control of the enemy AI at the time of the "fling attack" is explained along the flow of the flowchart in FIG. 5.

The enemy character control means 12 allows the individual enemy AIs to determine their motions as mentioned above. The lynching members are selected by the enemy management AI which controls all the enemies. The individual enemy AIs determine whether the individual enemies fling the player (step S21). When the enemy AI determines that the individual enemy flings the player, it sets the enemy action mode to the fling mode, so as to make the individual enemy continue the lynching until the parameter value showing the life of the individual enemy or the player becomes "0" (step S22). At this time, the enemy management AI calculates a distance between the positions of the enemies other than the enemy who flings the player and a specified position (in this embodiment, two positions on the right and left sides of the row on which the individual enemy is present), and selects a plurality of enemies (in this embodiment, two enemies) who are the closest to the specified position (a plurality of positions set within the visual range of the virtual camera with the visual point position which changes due to the enemy's attack being used as a reference) as the lynching members. When the individual enemy does not fling the player at step S21, the enemy management AI determines whether the individual enemy is selected as the lynching member (step S23). When the individual enemy is selected as the lynching member, the individual enemy is moved to the specified position (step S24), and the sequence goes to step S22 so that the self enemy continues the lynching.

Figure 6:
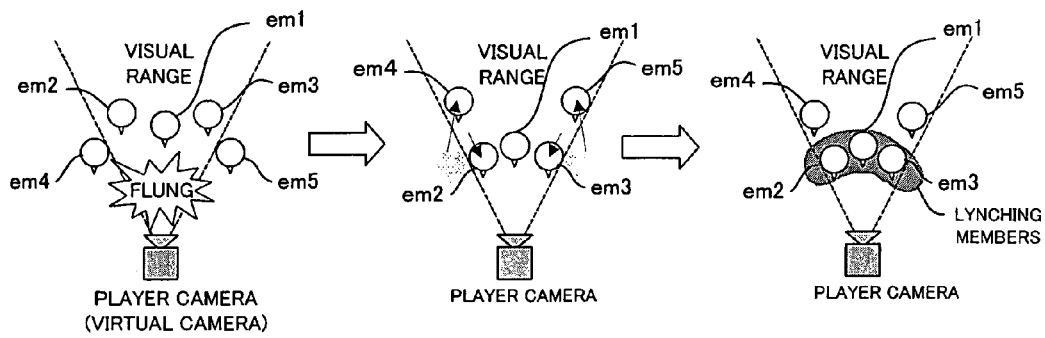
FIGS. 6A to 6C are pattern diagrams for explaining operating examples of the enemy characters at the time of the fling attack in the present invention.

The motion of moving to the specified position and the motions of the lynching members are explained with reference to FIGS. 6A to 6C. For example, in the state of FIG. 6A, when the player is flung by the enemy to fall, as shown in FIG. 6B, an enemy em1 who flung the player and another enemies em2 and em3 around the enemy em1 are made to approach the player within the visual range of the virtual camera. In this example, the enemy em1 and the enemies em2 and em3 move with them being in a row sideways, and enemies em4 and em5 outside the visual range move so as to enter the visual range (in the example of FIG. 6B, the enemies em4 and em5 move backward to the specified position on the back row). This is a device in order to produce the sense of assembled enemies. The enemies em2, em1 and em3 in a line on the front row become the "lynching members" as shown in FIG. 6C, and the player is continuously in the fallen state until the player knocks down the lynching members by operating the operating means (in this example, the gun controller). That is to say, the visual point position which changed due to the attack is maintained. In the case where the enemy character group within the visual range of the player character is completely knocked down, the visual point position of the player character which changes due to the attack is returned to the original position, and the game continues.

On the other hand, when the individual enemy is not selected as the lynching member at step S23, the individual enemy stands by until the lynching state is ended (step S25), and the mode is returned to the normal action mode after the lynching state ends (step S26). At step S21, the enemy AI which tries to make the fling attack posts the "fling preparation acknowledgment" to the camera work control means 13 at the timing that the attack is mounted, and posts the "fling acknowledgment" to the camera work control means 13 at the timing that the fling is carried out. These acknowledgments are posted by, for example, a process or the like for writing information showing these acknowledgments into the control table.

Figure 7:
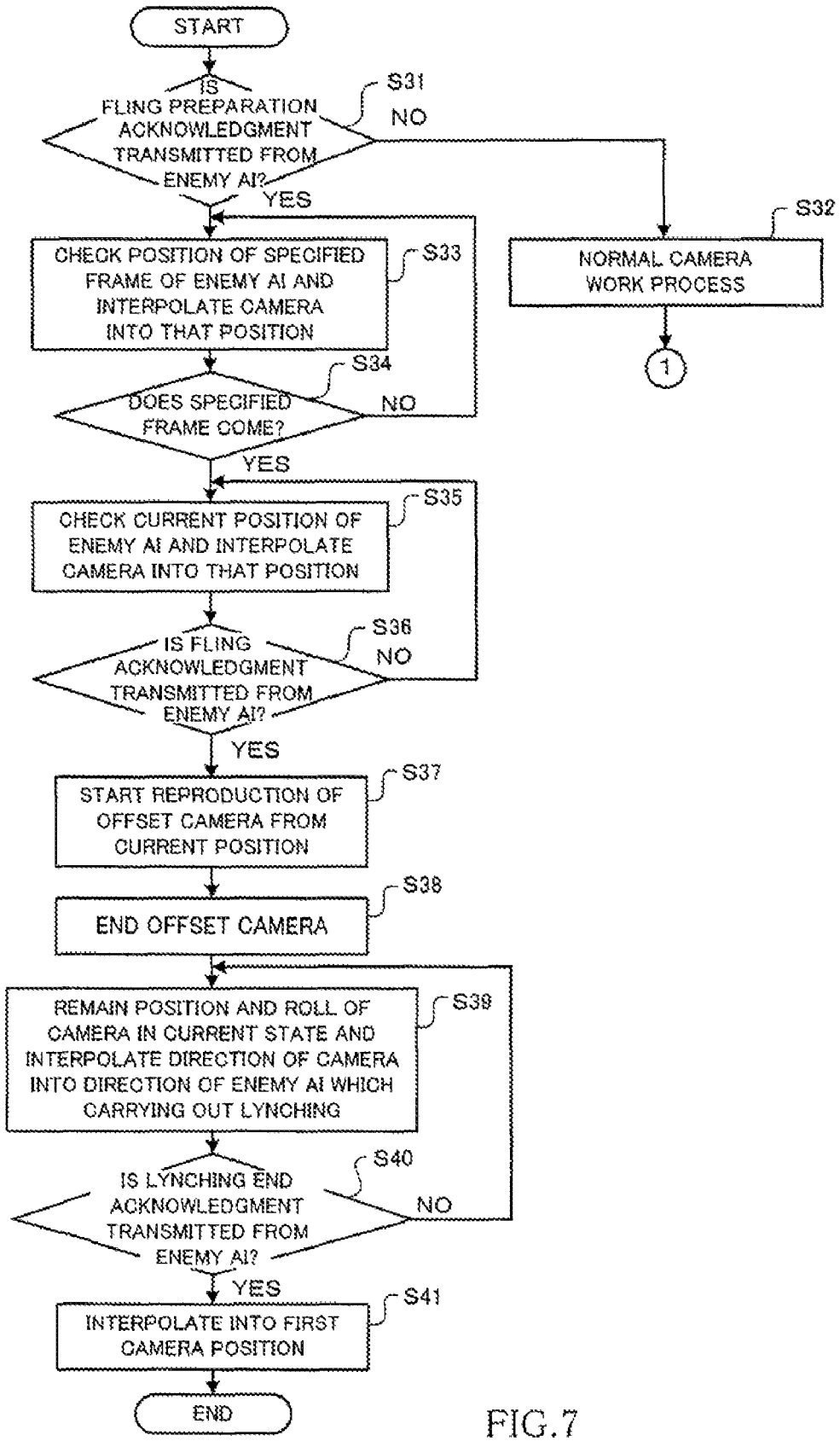
FIG. 7 is a flowchart for explaining a control of a virtual camera at the time of fling attack in the present invention.

The control of the virtual camera at the time of the "fling attack" is explained below along the flow of the flowchart in FIG. 7.

The camera work control means 13 determines whether the fling preparation acknowledgment is transmitted from the enemy character control means 12 (the enemy AI which flings the player) (step S31). When the acknowledgment is not transmitted, an image within the visual range is taken by the camera work in the normal mode (step S32). When the fling preparation acknowledgment is transmitted, the image taking mode switching means 14 switches the image taking mode from the normal mode into the special image taking mode, so that an image is started to be taken by the camera work in the special image taking mode.

At the special image taking mode, for example, the position of the specified frame of the enemy character control means 12 is checked, and the current camera position is designated by Pn, the next camera position (position after one frame) is designated by Pn+1, a speed at the time of interpolation is designated by rate, and a target position (the position of the specified frame) is designated by Po. The position of the virtual camera is interpolated into that target position by the following mathematical formula 1 (step S33).

$$Pn+1=Pn\times(1-\text{rate})+Po\times\text{rate} \quad \text{(Mathematical Formula 1)}$$

A determination is made whether the virtual camera comes to the target position of the specified frame (step S34), and when it does not come to the target position, the sequence returns to step S33 so that the interpolating process is continued. When the virtual camera comes to the target position, the position of the virtual camera is interpolated into the target position Po as the enemy's current position according to the mathematical formula 1 (step S35). Thereafter, a determination is made whether the fling acknowledgment is transmitted from the enemy character control means 12 (step S36). When the acknowledgment is not transmitted, the sequence returns to step S35 so that the interpolating process is continued. When the acknowledgment is transmitted, reproduction using the offset camera is started in the current position (step S37), and an image which shows that the player (virtual camera) is flung to be down (recorded data stored in advance) is output.

From the time when the output of the image from the offset camera is ended (step S38), the position and the roll of the camera is maintained in a current state (the camera falls on the ground), and the direction of the camera is interpolated into the direction of the enemy AI on the lynching motion. Due to this interpolating process, an image which shows that the player who is pushed down on the ground by the enemy looks up the enemy group is output (step S39). A determination is made whether lynching end acknowledgment is transmitted (step S40). When this acknowledgment is not transmitted, the sequence returns to step S39 so that the interpolating process is continued. When the lynching end acknowledgment is transmitted, the virtual camera is interpolated into the first position (the position at the time when the fling attack is started) (step S41). The image taking mode switching means 14 switches the image taking mode from the special image taking mode into the normal mode, and ends the control of the virtual camera at the time of the "fling attack".

The camera work of the virtual camera at the time when the player is brought up by the enemy at the fling attack (the interpolating process at the time of the fling attack) is explained below with reference to FIG. 8. In the present invention, in order to produce the sense of the fling, the behavior of the virtual camera is invented as follows.

Figures 8A, 8B:
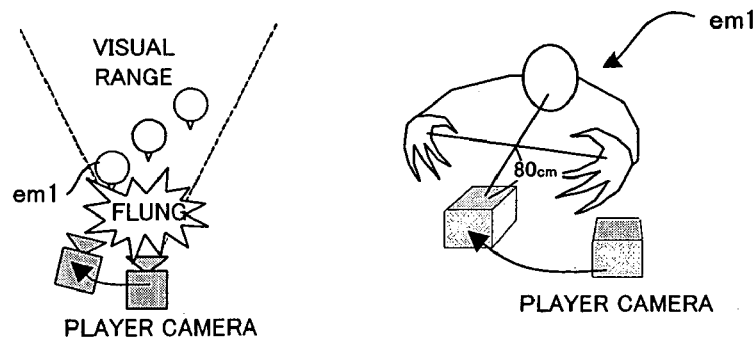
FIGS. 8A and 8B are pattern diagrams for explaining a control of the virtual camera at the time of the fling attack in the present invention.

As shown in FIG. 8A, for example, when the enemy em1 on the left viewed from the player (virtual camera) mounts the fling attack, the interpolating process for moving the virtual camera to the direction of the enemy is executed. At this time, the camera work control means 13 calculates a position of the intermediate point between the left and the right hand of the enemy em1 who mounts the attack based on the position coordinate of a hand and the position coordinate of a head portion of the enemy em1. The camera work control means 13 interpolates the visual point position of the virtual camera into a target position as a position separated from the intermediate point by a predetermined distance on the straight line passing through the head and the intermediate point. That is to say, as shown in FIG. 8B, the virtual camera is moved to a position which is separated from the intermediate point between the left hand and the right hand of the enemy em1 on the head level by a distance of 80 cm if the enemy's height is about 2 m. The target position in the height direction of the visual point at this time is a position of the enemy's face. The movement of the virtual camera produces an effect that the player is once brought up by the enemy before the enemy flings the player.

Figures 9A, 9B, 9C:
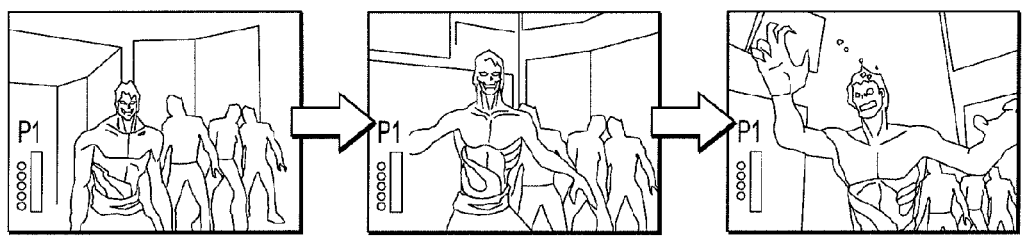
FIGS. 9A to 9C are screen examples illustrating transition of images according to camera work at the time of the fling attack in the present invention.

Thereafter, the virtual camera (player) is flung by the enemy, and the virtual camera is in a fallen state. At this time, the motion that the virtual camera falls is reproduced by the off set camera so that the coordinate of the player changes. The player is maintained in the fallen state until the player knocks down the lynching members. When the player knocks down the lynching member using the operating means, the virtual camera is returned to its original state completely. FIGS. 9A to 9C illustrate images to be displayed on the image display means. In the scene of the fling attack, the image transits from FIGS. 9A to 9B and 9C. In the fling state, as shown in FIG. 9C, the angle of the virtual camera is controlled so that the player slightly looks up the enemy.

Figure 10:
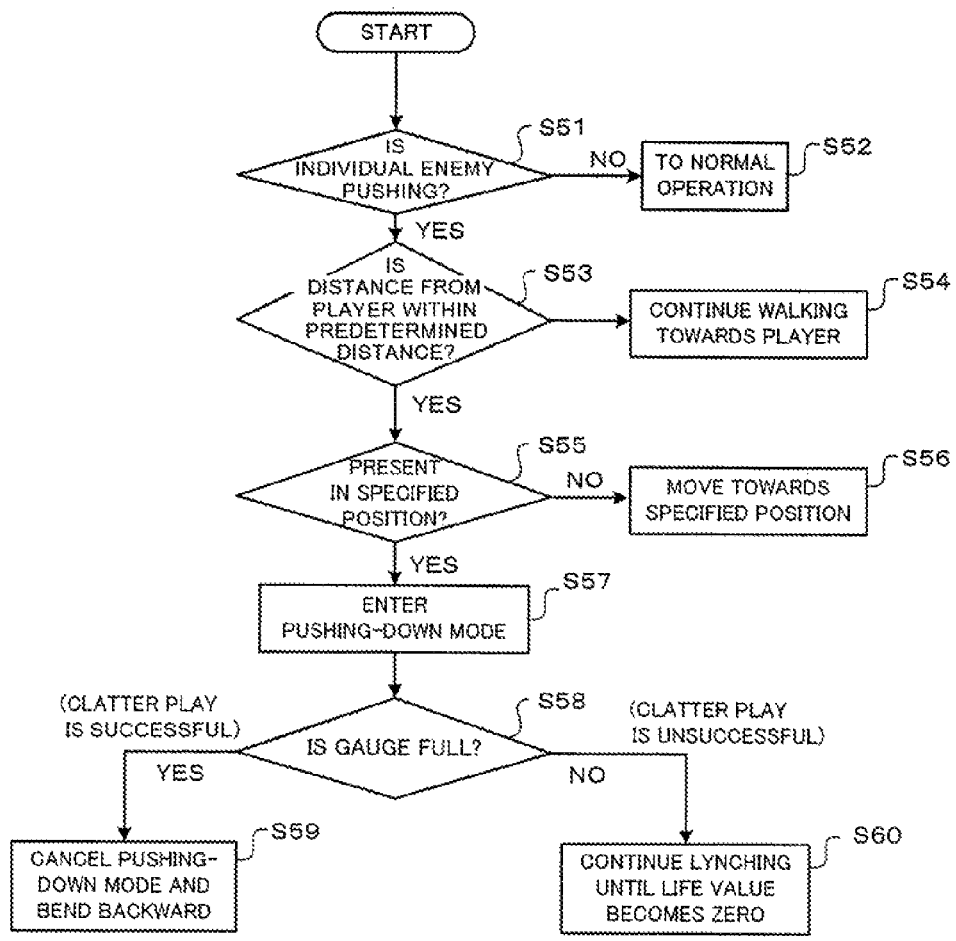
FIG. 10 is a flowchart for explaining a control of an enemy AI at the time of a pushing-down attack in the present invention.

The control of the enemy AI at the time of the "pushing-down attack" is explained along the flow of the flowchart in FIG. 10.

The enemy character control means 12 determines which enemy pushes the player (step S51), and when no enemy pushes the player, the normal mode (the mode at which the enemy walks to an arbitrary direction) is set (step S52). When the determination is made that an enemy pushes the player (in the case of the pushing-down mode), distances from another enemies to the player are calculated, and the enemy character control means 12 determines whether the individual enemies enter a predetermined distance range (step S53). When the enemies are not within the predetermined distance, the enemy character control means 12 controls the enemies so that they continue walking towards the player, for example, (step S54).

When the enemies are within the predetermined distance, the enemy character control means determines whether the enemies are in specified positions (step S55), and when they are in the other positions, it moves them towards the specified position (step S56). The determination is made at step S55 that the one or more enemies (for example, five enemies) are present in the specified positions, the pushing-down mode is set so that the pushing-down motion is started (steps S57). During this, the enemies are moved to and are assembled in the specified positions and are made to push the player in the assembled state. A determination is made whether the "clatter play" is possible (step S58), and when the clatter play is successful, the pushing-down mode is canceled, and the enemies are made to bend backward to avoid the player (step S59). On the other hand, when the clatter play is unsuccessful, the lynching members in a group are made to continue attacking the pushed-down player until the parameter value showing the life of all the lynching members becomes "0" (step S60).

The camera work of the virtual camera until the virtual camera is pushed down by the pushing-down attack (the interpolating process at the time of the pushing-down attack) is explained below with reference to FIGS. 11A to 11C.

Figures 11A, 11B, 11C:
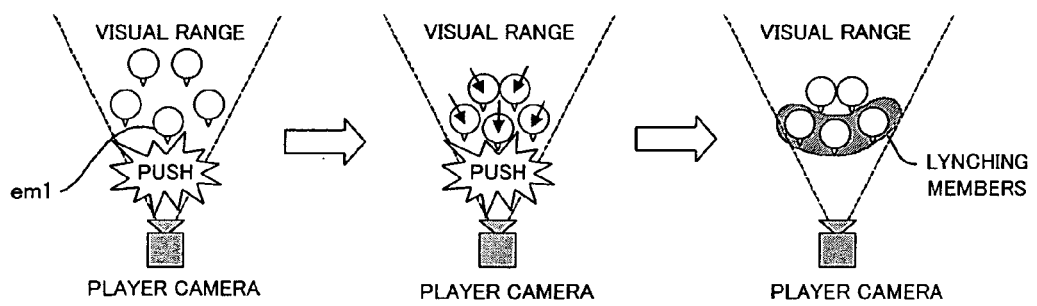
FIGS. 11A to 11C are pattern diagrams for explaining motion examples of the enemy characters at the time of the pushing-down attack in the present invention.

As shown in FIG. 11A, for example, when the center enemy em1 starts to push the player, the other enemies approach and in the pushing posture. That is to say, the enemies in the vicinity are moved to be assembled, and the motions of the assembled enemies are controlled respectively so that the enemies in a group push the player. At this time, as shown in FIG. 11B, as the number of the enemies on the rear row increases, it is more difficult that the clatter meter rises. For example, a control is made so that the increasing amount of the gauge (the increasing rate per means time) is reduced according to the number of the enemies making the pushing-down motion. When the player is pushed down, as shown in FIG. 11C, the enemies on the front row become lynching members, and the player is maintained in the fallen state until the enemies are knocked down.

Figure 12:
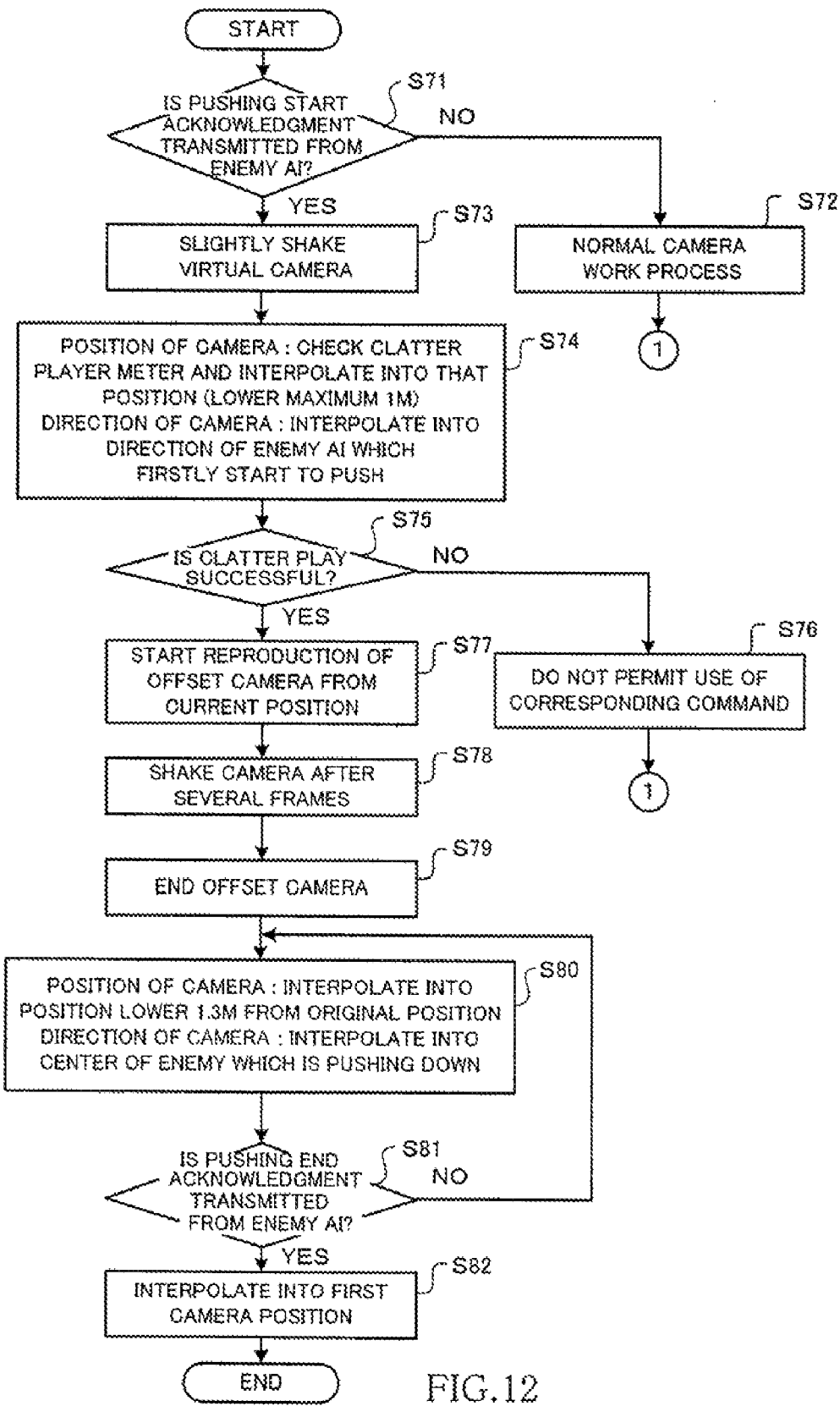
FIG. 12 is a flowchart for explaining a control of the virtual camera at the time of the pushing-down attack in the present invention.

The control of the virtual camera at the time of the "pushing-down attack" is explained below along the flow of the flowchart in FIG. 12.

The camera work control means 13 determines whether the pushing start acknowledgment is transmitted from the enemy character control means 12 (the enemy AI making the pushing motion) (step S71). When the acknowledgment is not transmitted, an image within the visual range is taken by the camera work in the normal mode (step S72). When the pushing start acknowledgment is transmitted, the image taking mode switching means 14 switches the image taking mode from the normal mode into the special image taking mode so that an image is started to be taken by the camera work in the special image taking mode.

At the special image taking mode at which the player receives the pushing-down attack, the virtual camera is slightly shaken up and down so that the height of the visual point position of the virtual camera is changed (step S73). Referring to the gauge (the clatter meter) which is increased based on the operating amount of the player, the height of the visual point position of the virtual camera is changed according to the amount of the gauge. The maximum value is set as a change amount of the virtual camera up and down at this time, and the visual point position is controlled to lower 1 meter at the maximum, for example. The direction of the camera is interpolated into the direction of the enemy AI which firstly starts to push. The position of a Y axis of the virtual camera (the position in the depth direction) and the position of an X axis may be interpolated according to the enemy's attack motions (a series of motions including the player's pushing-back motion) (step S74). Such an interpolating process is executed at every frame starting from the pushing start point, for example, and the height (and the direction) of the virtual camera is changed according to the operating amount of the operating means, the number of enemies, the setting value of enemy's body types and the like. At this time, the sum of the pushing-down forces of the enemy group assembled within the visual range of the virtual camera is compared with the force of beating off the enemy's attack determined based on the operating amount of the operating means. The change amount per means time in the height direction of the visual point of the virtual camera is changed according to a difference between both the forces. That is to say, the virtual camera is shaken according to the operating amount (clatter meter) of the operating means, and as the pushing-down force is stronger, the change amount (moving speed) of the virtual camera is set to be larger (step S75).

A determination is made whether the clatter play is successful (the breaking-off of the enemy's attack is successful), and when it is successful, the virtual camera is interpolated into the original position (the position of the starting point of the pushing-down attack). At this time, in the vicinity that the level of the clatter gauge becomes the maximum (the setting value showing the success of the clatter play), namely, just before the enemy is broken off, a control is made so that the change amount per means time in the height direction of the visual point of the virtual camera is small (step S76). An image showing that the enemy staggers about is output, and the image taking mode switching means 14 switches the image taking mode from the special image taking mode into the normal mode, so that the control of the virtual camera at the time of the "pushing-down attack" is ended.

On the other hand, when the clatter play is unsuccessful, the offset camera starts reproduction in the current position (step S77), and an image showing that the player (virtual camera) is pushed down (recorded data stored in advance) is output (step S78). The virtual camera is shaken after some frames, the output of the image from the offset camera is ended (step S79).

Thereafter, the position of the virtual camera is interpolated from the original position into a position which is below by a predetermined amount (for example, 1.3 m), and the direction of the camera is interpolated into the center position of the enemy in the lynching state, for example, so that intense fear just before the player is pushed down onto the ground is expressed (step S80). The interpolating process is repeated until the pushing end acknowledgment is transmitted (step S81). When the pushing end acknowledgment is transmitted from the enemy character control means 12, the position of the virtual camera is interpolated into the first position (the position of the starting point of the pushing-down attack) (step S82), and the image taking mode switching means 14 switches the image taking mode from the special image taking mode into the normal mode so that the control of the virtual camera at the time of the "pushing-down attack" is ended.

The method of interpolating the position of the virtual camera using the functional calculus is explained below.

Figure 13:
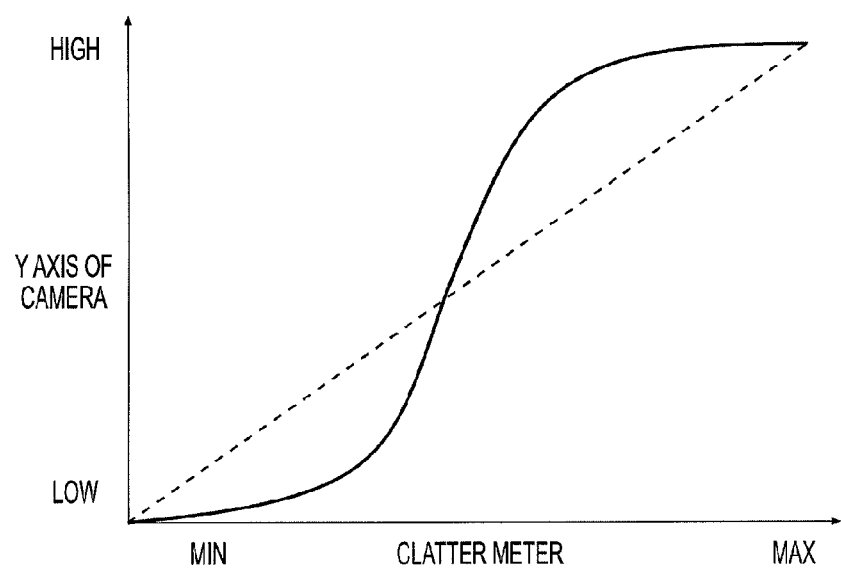
FIG. 13 is a diagram for explaining one example of a method of calculating a change amount of the virtual camera in a height direction in the present invention.

FIG. 13 is a graph illustrating one example of the function to be used for calculating the change amount (interpolating value) of the virtual camera in the height direction. In this embodiment, the operating amount at that time is assigned to the function which shows a relationship between the position of the Z axis of the virtual camera (the heightwise position) and the operating amount of the operating means (in this example, the amount of a detected signal from the acceleration sensor). In such a manner, the moving position of the virtual camera is calculated so that the position of the virtual camera is interpolated into this calculated position. In order to show a state that the player is pushed down by a lot of enemies, the height of the virtual camera is changed like the graph of FIG. 13. Just before the player is knocked down by the enemies (the value of the clatter meter is nearly minimum), and just before the player breaks off the enemies (the value of the clatter meter is nearly maximum), the change amount of the height of the camera is set to be small, so that the effects of close offensive and defensive battle with enemies, persistency, and tactics are produced.

Figure 14A:
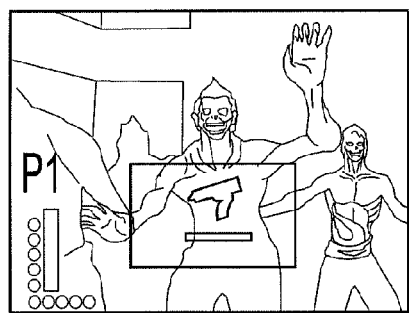
FIGS. 14A and 14B are screen examples illustrating transition of images according to the camera work at the time of the pushing-down attack in the present invention.
Figure 14B:
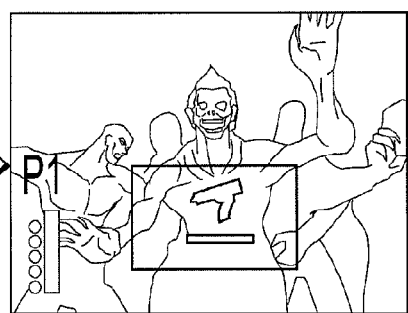

For example, when the clatter meter shows a nearly minimum value, as shown in FIG. 14A, the angle of the virtual camera is controlled so as to look up the enemy. When the clatter meter shows a nearly maximum value, as shown in FIG. 14B, the angle of the virtual camera is controlled so as to be approximately the same as that on the normal game screen. After the pushing-down, like the steps S80 and S81, the Z axis and the direction of the virtual camera are changed so that the virtual camera takes an image in a way that the virtual camera is pushed down and looks up the enemy. As a result, the sense of fear that the player is surrounded and attacked by the enemy group with the player being in a fallen state is expressed. When all the lynching members are knocked down in this state, the virtual camera is returned to the original state completely, so that the process in the special image taking mode is ended.

Figure 15:
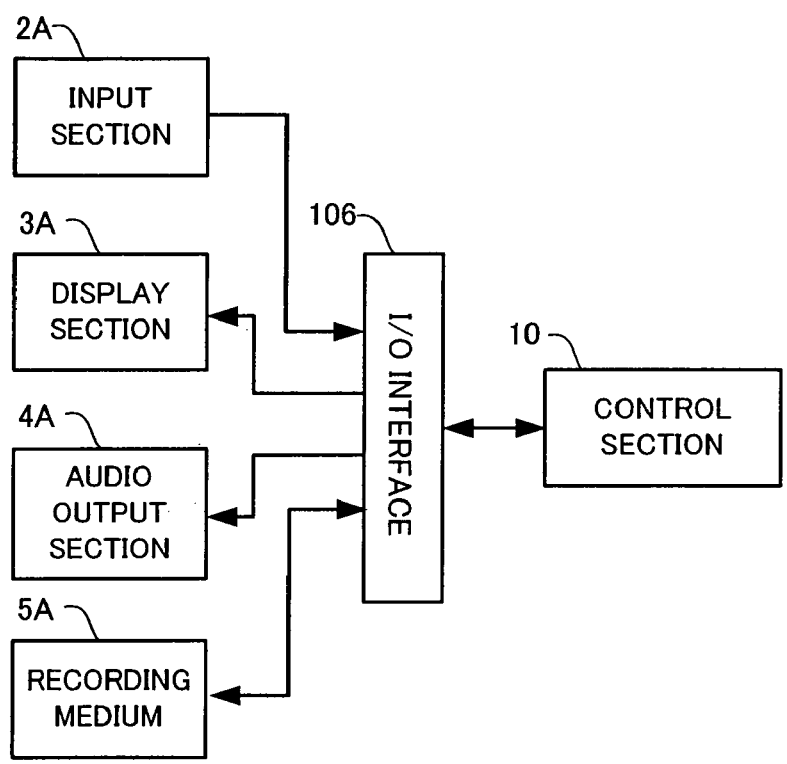
FIG. 15 is a block diagram illustrating another example of a hardware structure of the game apparatus according to the present invention.

The above embodiment explains the example that when an enemy is not selected as the lynching member, the enemy stands by until the lynching state is ended. In the above embodiment, however, monitoring is carried out whether the lynching members are knocked down by the player character and the lynching group has vacancies, and when the lynching group has vacancies, the stand-by enemy characters are sequentially moved so as to fill the vacancies. In such a manner, the vacancies may be filled. The above embodiment explains the case where on the assumption that one player plays the game, the image of the virtual camera (player camera) captured from that visual point is displayed on the screen of the display device. The present invention can be, however, applied to the form that a plurality of players play the game. In the form that a plurality of players play the game, for example, the screen is divided, images for the players are output onto the individual windows, or the individual images are output on the different individual display devices. Further, the embodiment explains the example that the present invention is applied to the commercial shooting game apparatus in which a fake gun having the acceleration sensor is used as the operating input device. However, the operating input device is not limited to the fake gun. The present invention is not limited to the commercial game apparatus, and thus can be applied to various information processing apparatuses having the general hardware structure shown in FIG. 15, such as domestic game apparatuses, personal computers and cellular telephones having game functions. In this case, as the operating input device (input section 2A), input devices such as a joy stick, controllers having various operating buttons and arrow keys, a keyboard and a mouse are used.

What is claimed is:

1. A game apparatus for displaying an enemy character controlled by a computer as a game image on a screen, wherein an operating means is for operation by a player for battling with the enemy character, the game apparatus comprising:
    an image generating means for using a visual point position of a player character moving in a virtual three-dimensional space as a visual point position of a virtual camera, and generating an image within a visual range captured by the virtual camera as the game image;
    an enemy character control means for allowing the enemy character to make an attack which changes the visual point position of the player character, and moving the enemy character within a specified range viewed from the visual point position changed due to the attack to a visual range of the player character viewed from the visual point position; and
    a camera work control means for changing the visual point position of the virtual camera in a three-dimensional coordinate system in conjunction with the attack,
    wherein the enemy character control means allows a first enemy character group within an attack possible range with respect to the visual point position of the player character to make a specified attack according to the visual point position, and allows a second enemy character group out of the attack possible range to stand behind the first enemy character group.

2. The game apparatus according to claim 1, wherein the enemy character control means monitors whether the first enemy character group is knocked down by the player character and whether the first enemy character group has a vacancy, and when the first enemy character group has a vacancy, the enemy character control means allows the second enemy character group to move sequentially so that the vacancy is filled.

3. A game apparatus for displaying an enemy character controlled by a computer as a game image on a screen, wherein an operating means is for operation by a player for battling with the enemy character, the game apparatus comprising:
    an image generating means for using a visual point position of a player character moving in a virtual three-dimensional space as a visual point position of a virtual camera, and generating an image within a visual range captured by the virtual camera as the game image;
    an enemy character control means for allowing the enemy character to make an attack which changes the visual point position of the player character, and moving the enemy character within a specified range viewed from the visual point position changed due to the attack to a visual range of the player character viewed from the visual point position; and
    a camera work control means for changing the visual point position of the virtual camera in a three-dimensional coordinate system in conjunction with the attack,
    wherein the visual point position changed due to the attack is maintained, and when an enemy character group within the visual range of the player character is knocked down completely, the visual point position of the player character changed due to the attack is returned to an original position.

4. A game apparatus for displaying an enemy character controlled by a computer as a game image on a screen, wherein an operating means is for operation by a player for battling with the enemy character, the game apparatus comprising:
    an image generating means for using a visual point position of a player character moving in a virtual three-dimensional space as a visual point position of a virtual camera, and generating an image within a visual range captured by the virtual camera as the game image;
    an enemy character control means for allowing the enemy character to make an attack which changes the visual point position of the player character, and moving the enemy character within a specified range viewed from the visual point position changed due to the attack to a visual range of the player character viewed from the visual point position; and
    a camera work control means for changing the visual point position of the virtual camera in a three-dimensional coordinate system in conjunction with the attack,
    wherein when one or more enemy characters within the specified range are moved to the visual range of the virtual camera, the enemy character control means allows the one or more enemy characters to be respectively aligned in a specified position and to be assembled within the visual range of the virtual camera.

5. A game apparatus for displaying an enemy character controlled by a computer as a game image on a screen, wherein an operating means is for operation by a player for battling with the enemy character, the game apparatus comprising:

an image generating means for using a visual point position of a player character moving in a virtual three-dimensional space as a visual point position of a virtual camera, and generating an image within a visual range captured by the virtual camera as the game image;

an enemy character control means for allowing the enemy character to make an attack which changes the visual point position of the player character, and moving the enemy character within a specified range viewed from the visual point position changed due to the attack to a visual range of the player character viewed from the visual point position; and a camera work control means for changing the visual point position of the virtual camera in a three-dimensional coordinate system in conjunction with the attack, wherein when the attack is an attack pattern for pushing down the player character, the enemy character control means controls motions of one or more enemy characters assembled within the visual range of the virtual camera so as to allow the one or more enemy characters in a group to push the player character.

6. A game apparatus for displaying an enemy character controlled by a computer as a game image on a screen, wherein an operating means is for operation by a player for battling with the enemy character, the game apparatus comprising:

an image generating means for using a visual point position of a player character moving in a virtual three-dimensional space as a visual point position of a virtual camera, and generating an image within a visual range captured by the virtual camera as the game image;

an enemy character control means for allowing the enemy character to make an attack which changes the visual point position of the player character, and moving the enemy character within a specified range viewed from the visual point position changed due to the attack to a visual range of the player character viewed from the visual point position; and a camera work control means for changing the visual point position of the virtual camera in a three-dimensional coordinate system in conjunction with the attack, wherein when the player character is pushed down onto the ground by the attack, the enemy character control means allows the enemy character which makes the attack and other characters to approach the player character within the visual range of the virtual camera.

7. A game apparatus for displaying an enemy character controlled by a computer as a game image on a screen, wherein an operating means is for operation by a player for battling with the enemy character, the game apparatus comprising:

an image generating means for using a visual point position of a player character moving in a virtual three-dimensional space as a visual point position of a virtual camera, and generating an image within a visual range captured by the virtual camera as the game image;

an enemy character control means for allowing the enemy character to make an attack which changes the visual point position of the player character, and moving the enemy character within a specified range viewed from the visual point position changed due to the attack to a visual range of the player character viewed from the visual point position; and a camera work control means for changing the visual point position of the virtual camera in a three-dimensional coordinate system in conjunction with the attack, wherein after the player character is pushed down or is flung by the attack, the enemy character control means controls motions of one or more enemy characters positioned in a front row aligned in the visual range of the virtual camera so as to allow enemy character in a group to attack the player character.

8. A game apparatus for displaying an enemy character controlled by a computer as a game image on a screen, wherein an operating means is for operation by a player for battling with the enemy character, the game apparatus comprising:

an image generating means for using a visual point position of a player character moving in a virtual three-dimensional space as a visual point position of a virtual camera, and generating an image within a visual range captured by the virtual camera as the game image;

an enemy character control means for allowing the enemy character to make an attack which changes the visual point position of the player character, and moving the enemy character within a specified range viewed from the visual point position changed due to the attack to a visual range of the player character viewed from the visual point position; and a camera work control means for changing the visual point position of the virtual camera in a three-dimensional coordinate system in conjunction with the attack, wherein when the attack is an attack pattern for flinging the player character, the enemy character control means allows the enemy character which makes the attack and other characters to move with the other characters being in a row sideways within the visual range of the virtual camera, and allows enemy characters which cannot be in the row sideways within the visual range of the virtual camera to move to a rear line.

9. A game apparatus for displaying an enemy character controlled by a computer as a game image on a screen, wherein an operating means is for operation by a player for battling with the enemy character, the game apparatus comprising:

an image generating means for using a visual point position of a player character moving in a virtual three-dimensional space as a visual point position of a virtual camera, and generating an image within a visual range captured by the virtual camera as the game image;

an enemy character control means for allowing the enemy character to make an attack which changes the visual point position of the player character, and moving the enemy character within a specified range viewed from the visual point position changed due to the attack to a visual range of the player character viewed from the visual point position; and a camera work control means for changing the visual point position of the virtual camera in a three-dimensional coordinate system in conjunction with the attack, wherein when the enemy character makes the attack by a motion of a hand of the enemy character, the camera work control means changes a height of the visual point of the virtual camera according to a change in the position of the hand, and changes a direction of the virtual camera to a direction of a head of the enemy character.

10. A game apparatus for displaying an enemy character controlled by a computer as a game image on a screen, wherein an operating means is for operation by a player for battling with the enemy character, the game apparatus comprising:

an image generating means for using a visual point position of a player character moving in a virtual three-dimensional space as a visual point position of a virtual camera, and generating an image within a visual range captured by the virtual camera as the game image;

an enemy character control means for allowing the enemy character to make an attack which changes the visual point position of the player character, and moving the enemy character within a specified range viewed from the visual point position changed due to the attack to a visual range of the player character viewed from the visual point position; and a camera work control means for changing the visual point position of the virtual camera in a three-dimensional coordinate system in conjunction with the attack, wherein when the player character is pushed down onto the ground by the attack, the camera work control means changes a direction of the virtual camera to an obliquely upward direction with respect to the visual point position of the player character in the pushed-down posture.

11. A game apparatus for displaying an enemy character controlled by a computer as a game image on a screen, wherein an operating means is for operation by a player for battling with the enemy character, the game apparatus comprising:

an image generating means for using a visual point position of a player character moving in a virtual three-dimensional space as a visual point position of a virtual camera, and generating an image within a visual range captured by the virtual camera as the game image;

an enemy character control means for allowing the enemy character to make an attack which changes the visual point position of the player character, and moving the enemy character within a specified range viewed from the visual point position changed due to the attack to a visual range of the player character viewed from the visual point position; and a camera work control means for changing the visual point position of the virtual camera in a three-dimensional coordinate system in conjunction with the attack, wherein when the attack is an attack pattern for pushing down the player character, the camera work control means reduces a change amount of the visual point position of the virtual camera in a height direction of the visual point position just before the player character is pushed down by the enemy character or the player character breaks off the enemy character.

12. A game apparatus for displaying an enemy character controlled by a computer as a game image on a screen, wherein an operating means is for operation by a player for battling with the enemy character, the game apparatus comprising:

an image generating means for using a visual point position of a player character moving in a virtual three-dimensional space as a visual point position of a virtual camera, and generating an image within a visual range captured by the virtual camera as the game image;

an enemy character control means for allowing the enemy character to make an attack which changes the visual point position of the player character, and moving the enemy character within a specified range viewed from the visual point position changed due to the attack to a visual range of the player character viewed from the visual point position; and a camera work control means for changing the visual point position of the virtual camera in a three-dimensional coordinate system in conjunction with the attack, wherein the camera work control means uses an operating amount of the operating means and a total number of enemy characters within an attack possible range in the visual range of the virtual camera as correcting parameters, and interpolates a change amount of the visual point position of the virtual camera based on the correcting parameters.

13. A game apparatus for displaying an enemy character controlled by a computer as a game image on a screen, wherein an operating means is for operation by a player for battling with the enemy character, the game apparatus comprising:

an image generating means for using a visual point position of a player character moving in a virtual three-dimensional space as a visual point position of a virtual camera, and generating an image within a visual range captured by the virtual camera as the game image;

an enemy character control means for allowing the enemy character to make an attack which changes the visual point position of the player character, and moving the enemy character within a specified range viewed from the visual point position changed due to the attack to a visual range of the player character viewed from the visual point position; and a camera work control means for changing the visual point position of the virtual camera in a three-dimensional coordinate system in conjunction with the attack, wherein when the attack is an attack pattern for pushing down the player character, the camera work control means compares a sum of forces of an enemy character group assembled within the visual range of the virtual camera for pushing down the player character with a force for breaking off the enemy character group determined based on an operating amount of the operating means sequentially, and changes a change amount per means time of the virtual camera in the height direction of the visual point position according to a difference between both of the forces.

14. A game apparatus for displaying an enemy character controlled by a computer as a game image on a screen, wherein an operating means is for operation by a player for battling with the enemy character, the game apparatus comprising:

an image generating means for using a visual point position of a player character moving in a virtual three-dimensional space as a visual point position of a virtual camera, and generating an image within a visual range captured by the virtual camera as the game image;

an enemy character control means for allowing the enemy character to make an attack which changes the visual point position of the player character, and moving the enemy character within a specified range viewed from the visual point position changed due to the attack to a visual range of the player character viewed from the visual point position; and a camera work control means for changing the visual point position of the virtual camera in a three-dimensional coordinate system in conjunction with the attack, wherein in the case where the attack is an attack pattern for flinging the player character or an attack pattern for clutching a body of the player character, when the enemy character which makes the attack is positioned on a left or a right side of the player character from the player's visual point, the camera work control means moves the virtual camera to a front position of the enemy character when the enemy character makes the attack.

15. A game apparatus for displaying an enemy character controlled by a computer as a game image on a screen, wherein an operating means is for operation by a player for battling with the enemy character, the game apparatus comprising:

an image generating means for using a visual point position of a player character moving in a virtual three-dimensional space as a visual point position of a virtual camera, and generating an image within a visual range captured by the virtual camera as the game image;

an enemy character control means for allowing the enemy character to make an attack which changes the visual point position of the player character, and moving the enemy character within a specified range viewed from the visual point position changed due to the attack to a visual range of the player character viewed from the visual point position; and a camera work control means for changing the visual point position of the virtual camera in a three-dimensional coordinate system in conjunction with the attack, wherein when the attack is an attack pattern for flinging the player character or an attack pattern for clutching a body of the player character, the camera work control means calculates a position of an intermediate point between a left hand and a right hand of the enemy character based on position coordinates of the hands and a head of the enemy character, and interpolates the visual point position of the virtual camera so that the visual point position of the virtual camera is on a straight line passing through the head of the enemy character and the intermediate point, and the straight line is separated from the intermediate point by a predetermined distance.

16. A game apparatus for displaying an enemy character controlled by a computer as a game image on a screen, wherein an operating means is for operation by a player for battling with the enemy character, the game apparatus comprising:

an image generating means for using a visual point position of a player character moving in a virtual three-dimensional space as a visual point position of a virtual camera, and generating an image within a visual range captured by the virtual camera as the game image;

an enemy character control means for allowing the enemy character to make an attack which changes the visual point position of the player character, and moving the enemy character within a specified range viewed from the visual point position changed due to the attack to a visual range of the player character viewed from the visual point position; and a camera work control means for changing the visual point position of the virtual camera in a three-dimensional coordinate system in conjunction with the attack, wherein the operating means has an acceleration sensor which detects an acceleration generated according to a predetermined operation, and the camera work control means changes the visual point position of the virtual camera according to a detected amount of the acceleration.

17. A non-transitory computer readable medium having stored thereon a program for execution by a computer in which an enemy character controlled by the computer is arranged in a virtual space, a battle is performed with the enemy character based on a manipulate signal from an operating means for operation by a player, and an image obtained by viewing the virtual space from a predetermined visual point is output as a game image to a display means, the program comprising a processing routine that when executed by the computer causes the computer to function as:

an image generating means for generating an image within a visual range captured by the virtual camera using a visual point position of the player character moving in a virtual three-dimensional space as a visual point position of the virtual camera;

an attack pattern selecting means for selecting an enemy character attack pattern from enemy character attack pattern information stored in a storage means;

a visual point moving means for, when the attack pattern selected by the attack pattern selecting means is an attack pattern with a predetermined conversion of the visual point, moving the visual point of the virtual camera to a visual point position according to the attack pattern;

an enemy character position determining means for determining whether the enemy character enters the visual range of the virtual camera viewed from the visual point position;

an enemy character moving control means for, when the determination is made that the enemy character did not enter the visual range of the virtual camera viewed from the visual point position, moving the enemy character to a predetermined enemy character position set within the visual range of the virtual camera; and an enemy character control means for, when the enemy character attacks the player character in a specified attack pattern, moving the enemy character so that the enemy character in the vicinity of the player character enters the visual range of the virtual camera, wherein when the player character is pushed down onto the ground by the attack, the camera work control means changes a direction of the virtual camera to an obliquely upward direction with respect to the visual point position of the player character in the pushed-down posture.

* * * * *